UNITED STATES PATENT OFFICE.

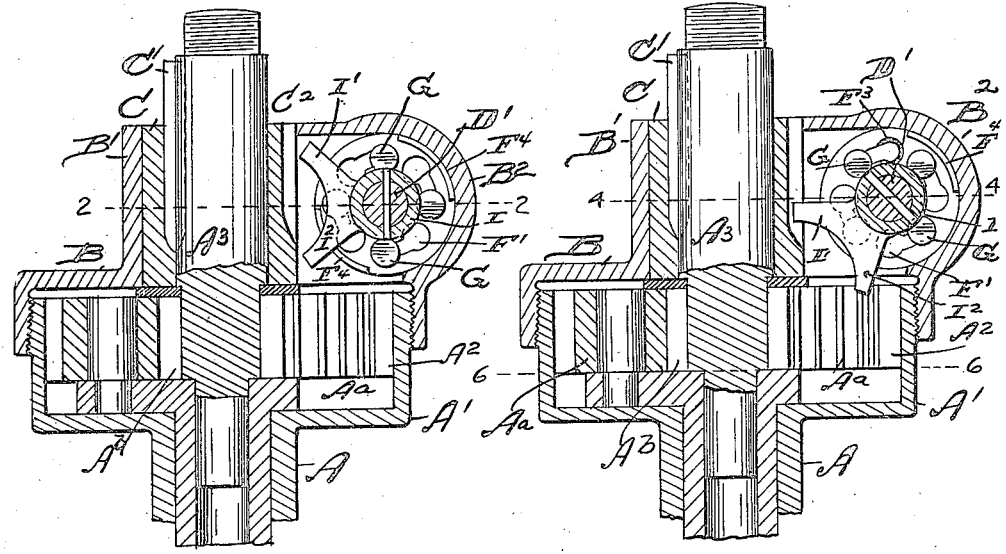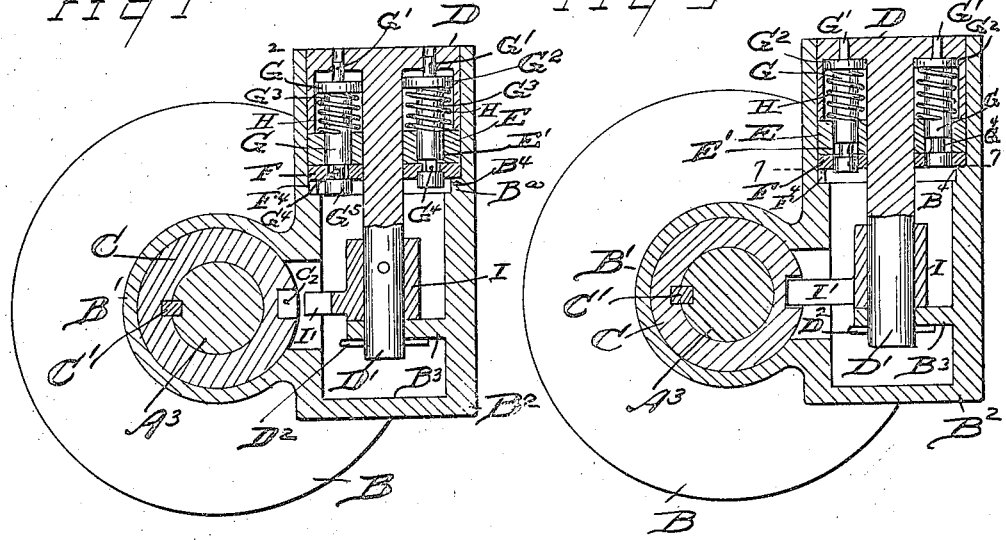

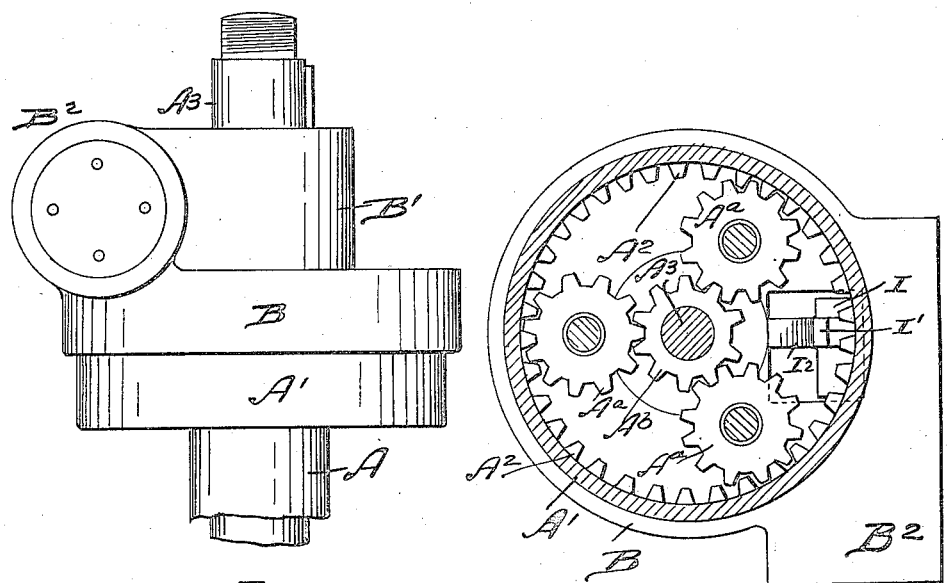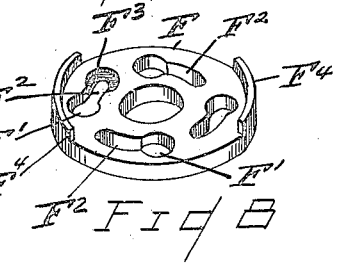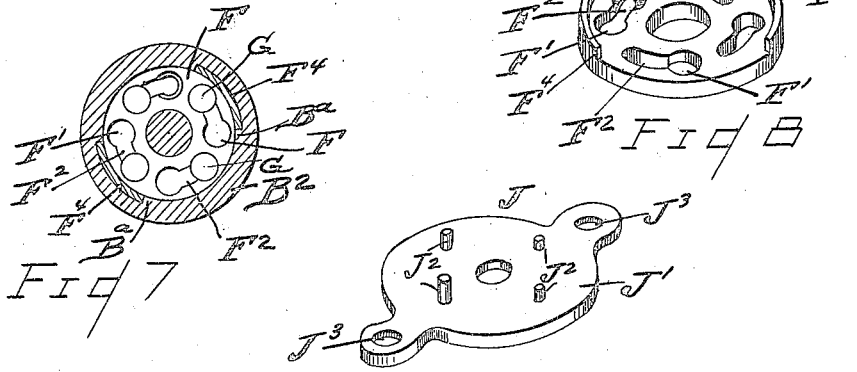

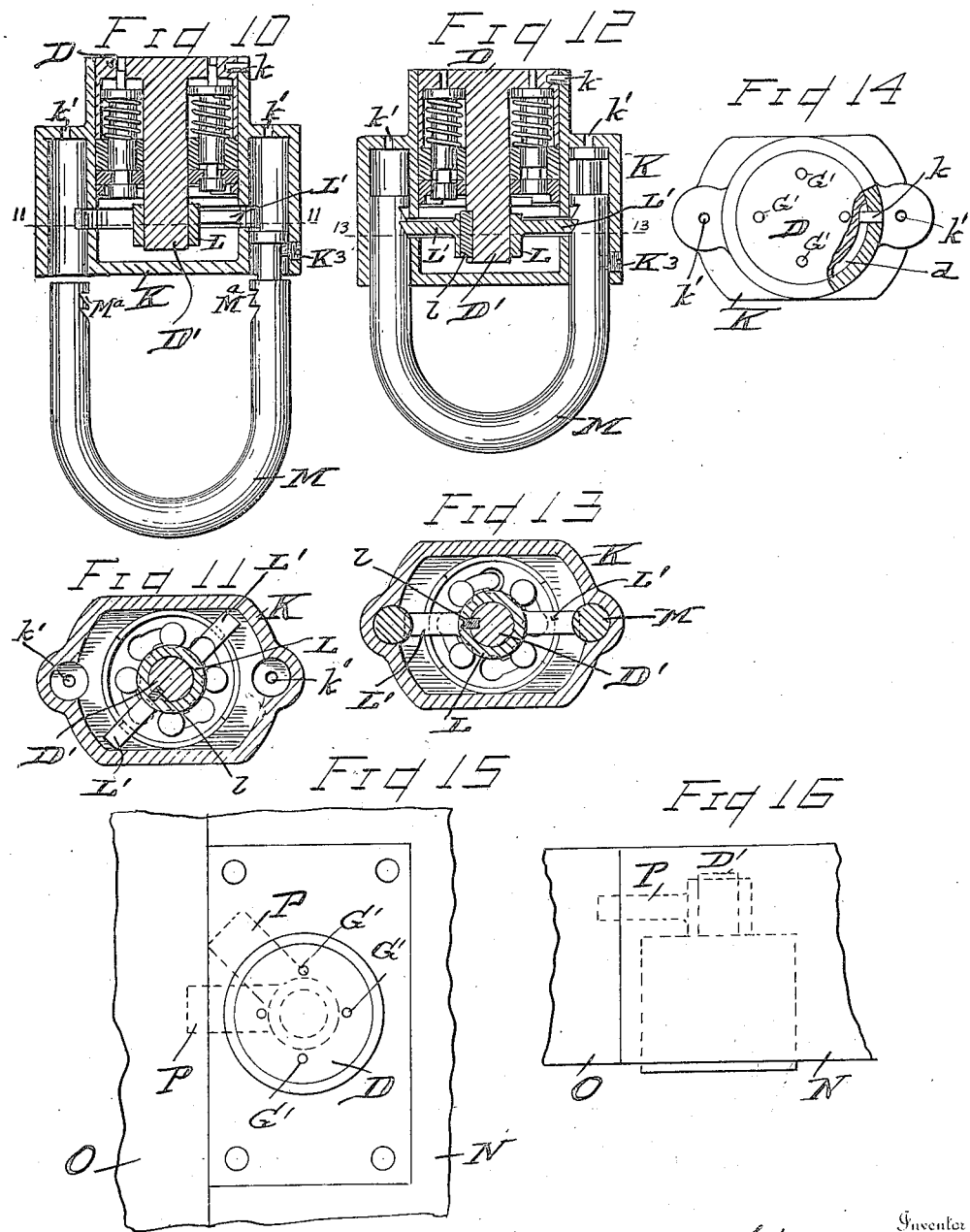

CHARLES P. SKUBLIN, OF DETROIT, MICHIGAN.

LOCK.

1,425,221. Specification of Letters Patent. Patented Aug. 8, 1922.

Application filed June 2, 1921. Serial No. 474,340.

*To all whom it may concern:*

Be it known that I, CHARLES P. SKUBLIN, citizen of Russia, residing at Detroit, county of Wayne, State of Michigan, have invented a certain new and useful Improvement in Locks, and declare the following to be a full, clear, and exact description of the same, such as will enable others skilled in the art to which it pertains to make and use the same, reference being had to the accompanying drawings, which form a part of this specification.

This invention relates to an improvement in locks, the construction being such that it may be employed as a padlock, door lock, or lock for securing the steering wheel of an automobile.

In the drawing the device has been shown as a padlock, door lock and as applied to the steering gear of a Ford automobile to secure the forward traction wheels against adjustment by an unauthorized person during the absence of the owner of the vehicle;—the forward traction wheels of the vehicle being preferably secured at an angle to the rear wheels of the vehicle to prevent use of the vehicle during the absence of the owner.

A further object of the invention is to provide a simple, inexpensive and effective means whereby the locking latch or bolt is securely held in both its "locked" and "released" relation to the wheel thus insuring against the accidental locking or releasing of the respective parts.

With the foregoing and other objects in view which will appear as the description proceeds the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a central vertical section through the planetary gear case of a Ford automobile showing in place of the usual cover employed on the Ford gear case one adapted to house the locking means for securing the steering wheel against movement; the steering wheel shaft being in its "unlocked" condition.

Figure 2 is a horizontal sectional view taken on or about line 2—2 of Figure 1 showing the steering wheel released or in condition to control the direction taken by the forward traction wheels.

Figure 3 is a central vertical sectional view similar to Figure 1, showing the steering wheel post in "locked" position.

Figure 4 is a horizontal sectional view taken on or about line 4—4 of Figure 3 showing the device in its "locked" relation to the steering wheel post.

Figure 5 is a side elevation of the device showing the outer end of the lock with its plurality of apertures for receiving a key fitted with a plurality of pins of different lengths adapted to enter the several apertures in the lock to actuate the latter.

Figure 6 is a horizontal sectional view through the planetary gear case taken on or about line 6—6 of Fig. 3 showing the locking bolt projected between the pinions housed within the planetary gear case.

Figure 7 is a cross sectional view taken on or about line 7—7 of Figure 4 showing the slotted disc through which the locking tumblers pass;—the tumblers being in locked position.

Figure 8 is a perspective view of the slotted disc showing its upstanding mutilated annular flange which is adapted to interlock with the wall of the lock-barrel portion of the cover fitted to the gear case.

Figure 9 is a perspective view of the key for operating the lock, showing its plurality of pins of different lengths designed to enter the apertures provided in the barrel of the lock and into which extend the projecting pins of the lock tumblers.

Figure 10 is a cross-sectional view of a modification of the device employed as a padlock; showing the padlock in its released position.

Figure 11 is a cross-sectional view through the padlock, taken on or about line 11—11 of Figure 10, showing the padlock "unlocked."

Figure 12 is a similar cross-sectional view of the padlock, showing the latter "locked."

Figure 13 is a cross-sectional view taken on or about line 13—13 of Figure 12 showing the padlock "locked."

Figure 14 is an end elevation, partly in section, showing means for securing the rotatable lock barrel in the enclosing case of the padlock.

Figure 15 is a fragmentary side elevation of a door and its casing, showing the lock employed to secure an ordinary swinging door, in "locked" and unlocked position.

Figure 16 is a fragmentary plan view of the door and its casing, showing the latch turned to secure the door.

Referring now to the letters of reference placed upon the drawings.

A, is a steering wheel post provided with a casing A' at its upper end in which are housed planetary pinions $A^a$ in mesh with an annular gear $A^2$ secured to or integral with the wall of the casing. $A^b$ is a main gear mounted on the steering wheel spindle $A^3$ in mesh with the pinions $A^a$ the mechanism being of the usual type and not in itself forming part of this invention.

B, denotes a cover screwed or otherwise detachably secured on the casing A'. The cover B is provided with a hub B' to receive a collar C secured to the steering wheel spindle $A^3$ by a spline or key C'. $B^2$ is a barrel shaped lateral extension of the cover adapted to receive the cylindrical casing D of the locking mechanism. $B^3$ denotes a partition in the chamber of the lateral extension $B^2$, bored to receive a spindle D' extending from the end wall of the lock casing. $D^2$ is a cotter pin projecting transversely through the spindle to secure the lock in the chamber of the lateral extension and against a shoulder $B^4$ formed therein. Loosely mounted upon the spindle D' is a disc E provided with a plurality of apertures E' which may be concentrically spaced from the axis of the spindle D' the apertures being in spaced relation though not necessarily equi-distant from each other. F, is another disc loosely mounted upon the spindle in adjacent relation to the disc E provided with a plurality of apertures F' corresponding in diameter and registering with the apertures E' in the disc E. Opening into said apertures are relatively narrow arc-shaped slotted openings $F^2$ the end of one of said slotted openings terminating in a counterbore $F^3$ having a diameter equal to the opening at the opposite end of its slotted opening. Projecting outwardly from the face of the disc F is a mutilated annular flange $F^4$ adapted to interlock with complementary ribs $B^a$ extending inwardly from the wall of the lateral extension $B^2$ whereby the disc F is secured against rotation. G, denotes a plurality of tumblers of plunger like form respectively housed in a series of bores spaced from each other in the barrel of the lock. The tumblers G are formed at one end with pins G' projecting into apertures provided in the end wall of the lock barrel. Directly back of the pins the tumbler has a disc-shaped shoulder $G^2$ of relatively larger diameter than its main body portion $G^3$. Near the opposite end of the tumbler the body portion is reduced to form a stem $G^4$ connecting the main body portion with the end $G^5$ of the tumbler which is of the same diameter as the body portion $G^3$. The diameter of the stem $G^4$ preferably corresponds with the width of the arc-shaped slots $F^2$ in the disc F, while the apertures F' in the disc F correspond with the diameter of the end $G^5$ of the tumblers. H denotes springs adapted to bear at one end against the disc E and at the other against the disc-shaped shoulder $G^2$ of the tumblers, the purpose of the springs being to normally maintain the pins G' flush with the end of the barrel of the lock as indicated in Figure 4 of the drawings. Mounted upon and secured to the spindle D' of the lock is a member I having a projecting finger I' adapted to enter the slotted way $C^2$ in the collar C to secure the steering wheel post against rotation. $I^2$ is a second finger extending from the member I adapted to swing between the pinions $A^a$ of the planetary gears to serve as an auxiliary means for securing the steering post against rotation. J indicates the lock key and it consists of a disc like plate J' provided with a plurality of pins $J^2$ of varying length projecting from the face of the disc and adapted to register with the openings in the end wall of the lock to force back the tumbler pins G' lodged in said apertures. The key is also provided with one or more holes $J^3$ for convenience in attaching it to a key ring or other like device.

Attention is directed to the fact that the pins $J^2$ are of varying length (and they may be irregularly spaced and of different gauge) the purpose being that when inserted in the barrel of the lock they serve to simultaneously project the tumblers an arbitrary distance in order that the stems $G^4$ of the several tumblers may be adapted to enter the arc-shaped slots in the disc F to permit rotation of the lock barrel by the key. It will be understood that by forcing the pins carried by the key into the lock barrel the tumblers will be simultaneously pushed back to a degree corresponding with the length of the several pins carried by the key. The arrangement and length of the pins being arbitrary it is necessary that a key fitted with pins of proper length shall be used in order to rotate the lock barrel.

The locking mechanism shown in the modifications indicated in Figures 10 to 16 is identical with that just described. The views however indicate other means in which the locking element may be employed. In Figures 10 to 14 a padlock is shown embodying an outer shell K chambered to receive the casing D of the locking mechanism. Secured to the spindle D' of the locking mechanism is a latch member L having radially projecting arms L' adapted to engage the ratchet teeth $M^a$ of a padlock shackle M, one arm of which is relatively longer than the other and recessed to receive a pin K³ projecting from the wall of the shell K into said recess to secure the shackle to the shell that it may not be disconnected therefrom when unlocked. In order that the latch member may be readily assembled with the spindle of the locking mechanism the end of the spindle may be squared to enter a squared hole in the latch member or it may be provided with a key $l$ adapted to project into a key-way in the latch. To secure the barrel containing the locking mechanism in the shell K a pin $k$ is provided supported in the wall of the shell and extending into a peripheral groove $d$ formed in the wall of the locking mechanism. $k'$ $k'$ are apertures through the shell to release any water that may enter the respective chambers.

In Figures 15 and 16 is shown the lock applied to a swinging door the operation of the locking mechanism being the same as that previously described: N indicates the swinging door to which the lock is fitted and O indicates the door frame or casing. P denotes a swinging latch carried by the spindle of the locking mechanism: the latch being shown in Figure 15 in dotted lines in both its locked and released positions.

Having indicated the several parts by reference letters it will now be assumed that the steering wheel shaft is in condition to control the adjustment of the forward traction wheels;—the locking latch being released from the collar C of the steering wheel spindle as indicated in Figure 1 of the drawings. To secure the steering wheel against operation the key with its pins of varying length is inserted in their respective apertures thereby projecting the end G⁵ of the several tumblers beyond the end of the disc F. The lock barrel may then be rotated by the key,—the stem G⁴ of the tumblers entering the arc-shaped slots of the disc F thus rotating the spindle carrying the latch member I,—its finger I' entering the slot C² in the collar C, while the finger I² enters between the gears A² in the gear case, as shown in Figures 3 and 4 of the drawings;—the latch being held against accidental release by the ends G⁵ of the tumbler which upon withdrawal of the key are forced through the action of the spring H back into the apertures in the fixed disc F.

To release the steering wheel shaft the key with its pins is again inserted into apertures in the end of the lock barrel thereby forcing the tumblers inwardly so that their stems G⁴ may again register with the arc-shaped slots in the disc F. The lock barrel may be then rotated to its initial position as shown in Figure 1 thus withdrawing the latch fingers from engagement with the collar C of the steering wheel spindle and from between the gears in the gear case. To prevent the accidental entry of the latch finger into the slotted groove of the collar C and between the gears of the gear case one of the slots in the disc F is counterbored to receive the end G⁵ of the tumbler operating through its arc-shaped slotted opening;— the action of the spring upon the withdrawal of the key forcing the end G⁵ of the tumbler into the counterbore as clearly shown in Figure 2 of the drawings, thus the locking latch is securely held in released position to the collar C of the steering wheel spindle and its planetary gears.

What I claim is:

1. In a lock, a casing, a rotatable member housed within the casing having a spindle projecting beyond the end of said casing, a latch member secured to the spindle, latch engaging means adapted to co-operate with the latch member, a plurality of tumblers housed within and carried by the rotatable member having peripheral grooves at one end and provided at their opposite end with pins of varying length extending into holes in the wall of said rotatable member, a disc loosely mounted upon the spindle having a plurality of bores and an arc-shaped slot connected with each bore through which the end of the tumblers may project, springs sleeved upon the tumblers to maintain the latter at the end of their longitudinal movement, and a co-operating key having a plurality of pins of varying length adapted to simultaneously bear upon the tumblers, whereby the peripheral grooves in the latter may be brought into registration with the arc-shaped slots of the disc that the latch member may be rocked through the operation of the key to engage or release the latch engaging means.

2. In a lock, a casing, a rotatable member housed within the casing having a spindle projecting beyond the end of said casing, a latch member secured to the spindle, latch engaging means adapted to co-operate with the latch member, a plurality of tumblers housed within and carried by the rotatable member having peripheral grooves at one end and provided at their opposite end with pins of varying length extending into holes in the wall of said rotatable member, a disc loosely mounted upon the spindle having a plurality of bores and an arc-shaped slot connected with each bore through which the end of the tumblers may project, means for securing said disc against rotation, springs sleeved upon the tumblers to maintain the latter at the end of their longitudinal movement, and a co-operating key having a plurality of pins of varying length adapted to simultaneously bear upon the tumblers, whereby the peripheral grooves in the latter may be brought into registration with the arc-shaped slots of the disc that the latch member may be rocked through the operation of the key to engage or release the latch engaging means.

3. In a lock, a casing, a rotatable member housed within the casing having a spindle projecting beyond the end of said casing, a latch member secured to the spindle, latch engaging means adapted to co-operate with the latch member, a plurality of tumblers each having a peripheral groove at one end and a pin at their opposite ends of varying length extending into holes in the wall of said rotatable member, a fixed disc loosely mounted upon the spindle having a plurality of bores and an arc-shaped slot connected with each bore through which the end of the tumblers may project with one of said openings counterbored, springs sleeved upon the tumblers to maintain the latter at the end of their longitudinal movement and the end of one of said tumblers in the counterbore of the disc member when released from the control of the co-operating key, and a co-operating key having a plurality of pins of varying length adapted to simultaneously bear upon the tumblers whereby the peripheral grooves of the latter may be forced against the action of the springs into registration with the arc-shaped slots of the disc that the latch member may be rocked through the operation of the key to engage or release the latch engaging means.

4. In a lock; a casing; a rotatable member including a spindle housed within the casing, a latch member secured to the spindle, a plurality of tumblers each having a peripheral groove at one end, lodged in bores formed in the rotatable member; a fixed disc loosely mounted upon the spindle having a plurality of bores and an arc-shaped slot connected with each bore through which the tumblers may rock,—with one of said openings counterbored to receive the end of the tumbler operating therein; springs adapted to maintain the tumblers at the end of their longitudinal movement and one of said tumblers in the counterbore of the disc member when released from the control of a co-operating key; and a co-operating key having a plurality of pins of varying length adapted to simultaneously force the tumblers inwardly whereby the peripheral grooves of the respective tumblers may be brought into registration with the arc-shaped slots of the disc that the latch member may be rocked upon the operation of the key.

In testimony whereof, I sign this specification in the presence of two witnesses.

CHARLES P. SKUBLIN.

Witnesses:
S. E. Thomas,
John Considine.